3,216,933
METHOD FOR PREVENTING DRILL PIPE FROM STICKING
Arthur Park, James L. Lummus, and Platho P. Scott, Jr., Tulsa, Okla., assignors to Pan American Petroleum Corporation, Tulsa, Okla., a corporation of Delaware
No Drawing. Filed Aug. 2, 1962, Ser. No. 214,181
3 Claims. (Cl. 252—8.5)

The present invention is concerned with a method for preventing drill pipe from sticking to the walls of a formation penetrated by a well. More particularly, it is concerned with an improved drilling fluid capable of preventing the occurrence of stuck drill pipe against the well face by means of differential pressure between the drilling mud cake and the formation.

Briefly, we solve this problem by incorporating into the drilling mud a hard particulate material, preferably of substantially uniform size. The solid particles in the mud stream in sufficient quantity keep the drill pipe a proper distance from the well wall, in contrast to other methods of handling the problem of differentially stuck drill pipe, as described in copending application U.S. Serial No. 205,130, filed by us June 25, 1962. In carrying out the process of our invention, these solid particles should be maintained in the complete mud system. In other words, such particles cannot be effectively used by spotting them in the well at the level where differential sticking occurs. Thus, when a well is being drilled through a formation or formations in which it is known that differential sticking occurs, the mud system should be changed to one containing these solids before such formations are encountered.

Frequently, in drilling operations, particularly at depths in excess of 10,000 to 12,000 feet, the drill pipe becomes stuck and cannot be rotated or removed from the hole. In any hole where the mud pressure is substantially higher than the formation fluid pressure, a mud cake forms opposite the permeable section of the hole and a flow of filtrate passes through the mud cake and into the formation, thus thickening the mud. It has been previously observed that a pressure differential from the well bore to a permeable formation covered with mud cake can hold the pipe next to the well bore wall with great force. This occurs when a portion of the pipe rests against the wall of the well, embedding itself in the filter cake. The area of the drill pipe in contact with the cake is thus sealed off from the full hydrostatic pressure of the mud column. The pressure difference between the mud column pressure and the formation pressure acts on the area of drill pipe in contact with the mud cake to hold the pipe against the wall of the hole. The degree to which this phenomenon occurs depends on a number of factors, such as mud weight, the permeability of the formation, the area of contact of the pipe with the mud cake, fluid loss properties of the mud, the time that the pipe remains in contact with the thickened filter cake, etc.

As examples of hard particulate materials suitable for use in our invention, there may be mentioned steel shot, aluminum shot, sand, walnut shells, plastic and the like. An important factor in this regard is that the particls be substantially uniform in size and range from about 10 to about 40 mesh. This is in contrast, for example. to the use of similar materials, such as nut shells, in drilling muds to prevent lost circulation. In the latter case, a gradation in particle size is definitely required to secure the proper plugging action for preventing loss of mud circulation. Batches of particles having random dimensions or a gradation in size are undesirable in the process of our invention, however, because the supporting strength of the entire mass of particles is less than can be secured with a material of uniform particle size. Thus, with a random sized material, maximum supporting strength is not obtained until all of the larger particles have been crushed or embedded into the rock to a point where the space between the pipe and the formation approaches at least the size of the smallest particle used. With particles of substantially uniform size the mass initially has maximum supporting strength and, hence, the distance between the drill pipe and the formation face will be maintained, thus preventing the pipe from becoming stuck when such phenomenon might otherwise occur.

Within the aforesaid particle size range, the larger the particles, the more effective they are. However, for actual operation this size is limited to the mesh size of the shale shaker screen. Another factor of importance is the hardness of the particulate material used. A convenient measure of this characteristic is the Mohs scale used by mineralogists. On this scale, ordinary steel has a hardness of about 5 while walnut shells are about 3, with suitable plastic materials ranging from about 2 to 3. Substances having a hardness less than about 2 on the aforesaid scale are too soft and suffer abrasion or breakage while the drilling mud is passing through the pumps and flowing in the well. The quantity of these solid particles used in carrying out our invention may vary rather widely. However, in the majority of instances we have found that concentrations ranging from about 2 to about 30 pounds per barrel of drilling fluid are ordinarily satisfactory, with from about 6 to 15 pounds per barrel usually being preferred.

The different hard materials investigated were tested for their ability to prevent stuck pipe. First, in a low pressure differential device such as described in "Drilling and Production Practice," page 55, by W. E. Helmick and A. J. Longley, presented by A. J. Longley at the spring meeting of the Pacific Coast District, Division of Production, Los Angeles, California, May 1957. However, before the ability of these harder materials to function properly for their intended use was established to our satisfaction, they were subjected to conditions which, in all important respects, duplicated conditions encountered in a well causing differential sticking. Thus, in testing such materials, they were first incorporated into the drilling mud in a concentration within the above recited range after which a differential pressure of 500 p.s.i. was applied for five minutes across the interface between the mud and the formation. The drill pipe was next forced against the resulting mud cake for a period of ten minutes. Thereafter, the amount of force was measured (in pounds) required to free the stuck pipe.

The effectiveness of various particulate materials when subjected to a low (15 p.s.i.) differential pressure is shown in the table below. In these tests, a gyp-Q-Broxin mud was employed weighting 16 pounds per gallon. Q-Broxin is a commercially available mud thinner consisting essentially of iron and chrome lignin salts. This material was added to a typical mud containing bentonite, native clay. a hydrocarbon such as, for example, diesel oil, and a weighting agent, such as barium sulfate.

Table I

| Material | Mesh Size | | Lb./bbl. | Percent Reduction in Required Pullout Force |
|---|---|---|---|---|
| Steel shot | <20 | >25 | 3 | 100 |
| Aluminum shot | <20 | >25 | 3 | 70 |
| Sand | <20 | >25 | 3 | 60 |
| Polyethylene plastic | <20 | >25 | 3 | 30 |
| Walnut Shells | <20 | >28 | 3 | 86 |
| Do | <20 | >28 | 6 | 100 |
| Do | <20 | >35 | 3 | 60 |
| Sand | <20 | >28 | 6 | 100 |

Tests carried out at 500 pounds pressure under simulated drilling conditions illustrating the use of our invention to liberate stuck drill pipe are shown in the table below. In this work only ground nutshells were used. However, other particulate materials of the type taught herein exhibit degrees of performance, with respect to walnut shells, comparable to the results shown in Table I. The ground walnut shells used, with the one exception noted in the table, were of a size such that they pass through a 14 mesh screen, but were retained on a 30 mesh screen. The tests were run at temperatures ranging from 80° to 400° F., the severity of the test conditions increasing with temperature due primarily to deterioration in fluid loss characteristics of the mud.

Table II

| Additive | Amount, lbs./bbl. | Temperature, ° F. | Pullout Force in Pounds | Percent Reduction |
|---|---|---|---|---|
| Blank | | 400 | 460 | |
| Do | | 300 | 400 | |
| Do | | 200 | 360 | |
| Do | | 80 | 260 | |
| Walnut Shells (30-40 mesh) | 12 | 80 | 0 | 100 |
| Walnut Shells (30-14 mesh) | 10 | 80 | 0 | 100 |
| Do | 10 | 200 | 60 | 83 |
| Do | 10 | 300 | 60 | 85 |
| Do | 10 | 400 | 280 | 40 |

The mud in this case was a Q-Broxin field mud having a density of 16.8 pounds per gallon.

From the foregoing it will be apparent that the incorporation of hard particulate materials within the size range specific herein serves very effectively to combat the problem of differential sticking.

The expression "heavy mud" or "heavy drilling fluid," as used herein, is intended to mean a drilling fluid which, in addition to water, contains a material such as barite which serves as a weighting agent. Also, these heavy muds contain a viscosity dispersing agent such as chrome or ferro chrome lignin salts plus sufficient caustic to dissolve the lignin salts. These muds generally have a density of at least 12 lbs./gal. and have a pH usually in the range of 8 to 13. They may also contain a weighting agent such as galena to bring the weight of the mud up to a maximum of about 20 to 25 pounds per gallon.

We claim:

1. In a method for preventing the occurrence of differentially stuck drill pipe wherein a well is being drilled into a formation using a liquid drilling fluid and wherein there is a pronounced tendency for said pipe to become stuck to the wall of said well, the improvement which comprises incorporating into said fluid about 10 to about 30 pounds per barrel of steel shot ranging in size from about 10 to about 40 mesh.

2. In a method for preventing the occurrence of differentially stuck drill pipe wherein a well is being drilled into a formaiton using a liquid drilling fluid and wherein there is a pronounced tendency for said pipe to become stuck to the wall of said well, the improvement which comprises incorporating into said fluid from about 10 to about 30 pounds per barrel of aluminum shot ranging in size from about 10 to about 40 mesh.

3. In a method for preventing the occurrence of differentially stuck drill pipe wherein a well is being drilled into a formation using a liquid drilling fluid and wherein there s a pronounced tendency for said pipe to become stuck to the wall of said well, the improvement which comprises incorporating into said fluid from about 10 to about 30 pounds per barrel of sand ranging in size from about 10 to about 40 mesh.

References Cited by the Examiner

UNITED STATES PATENTS

| 2,802,531 | 8/57 | Cardwell et al. | 252—8.55 |
| 2,859,819 | 11/58 | Trott | 252—8.55 |
| 2,943,679 | 7/60 | Scott et al. | 252—8.5 |
| 2,943,680 | 7/60 | Scott et al. | 252—8.5 |
| 2,950,247 | 8/60 | McGuire et al. | 252—8.55 |
| 2,962,095 | 11/60 | Morse | 166—8 |
| 3,047,494 | 7/62 | Browning | 252—8.5 |

OTHER REFERENCES

Rogers: Composition and Properties of Oil Well Drilling Fluids, Second Edition, published 1953 by Gulf Pub. Company of Houston, Texas, pages 497, 516 and 517.

JULIUS GREENWALD, *Primary Examiner.*

ALBERT T. MYERS, *Examiner.*